Feb. 15, 1927.
F. A. RUFF
1,617,768
LUGGAGE CARRIER
Filed Aug. 14, 1925
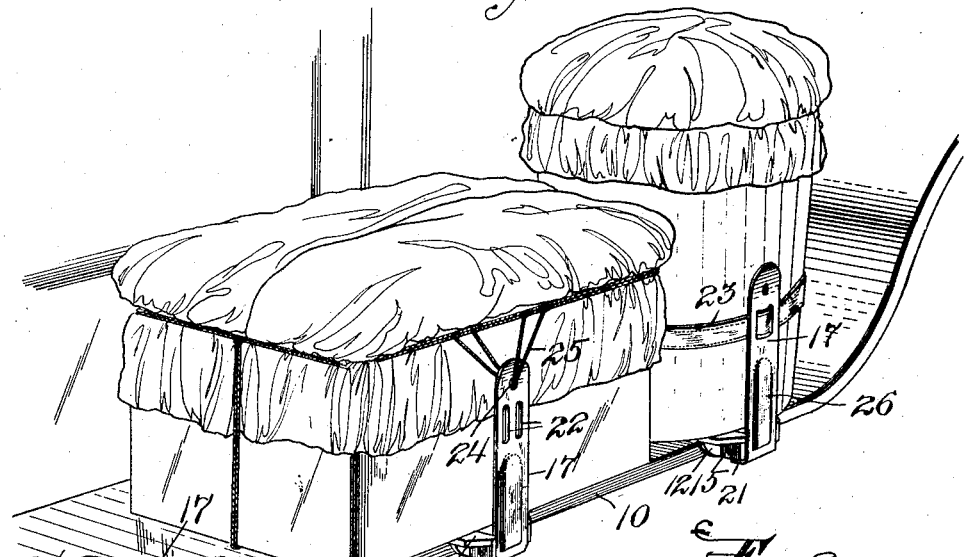
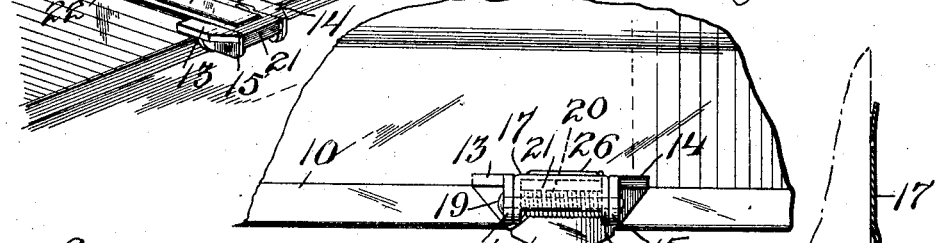
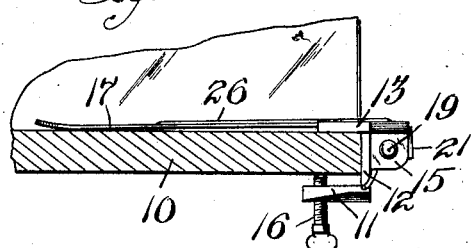
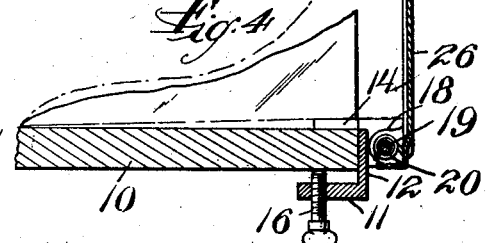
INVENTOR.
Frederick A. Ruff,
BY Wm. H. Caufield.
ATTORNEY Patented Feb. 15, 1927.

1,617,768

UNITED STATES PATENT OFFICE.

FREDERICK A. RUFF, OF NEWARK, NEW JERSEY.

LUGGAGE CARRIER.

Application filed August 14, 1925. Serial No. 50,194.

This invention relates to an improved luggage carrier and is of that type that is fastened to the edge of a board or platform and offers no obstruction to the ordinary use thereof but which can be raised to form a holding arm to secure bundles and packages in place. This feature makes it particularly adaptable to the running boards of automobiles and while it offers no appreciable obstruction and lies substantially flat when not in use, it securely holds any package placed on the running board. To make the invention clearly understood it is illustrated and described as applied to an automobile.

The invention is illustrated in the accompanying drawings in which Figure 1 is a perspective view of part of an automobile and showing several of my improved carriers in place. Figure 2 is an edge view of a running board with a carrier attached. Figure 3 is a side view of the device shown in Figure 2 and Figure 4 is a similar view with the leaf of the carrier raised. Figure 5 is a perspective view of the leaf of the carrier.

The drawing shows the running board 10 of an automobile and secured thereto I show several carriers. The carrier comprises a bracket which is readily attached to and detached from the edge of the running board, the bracket being U-shaped when viewed from the side and is claw-like when viewed from the top.

The bracket comprises a bottom plate 11, an upright plate 12 and two separated top plates 13 and 14. Projecting from the upright plates are the ears 15 somewhat widely separated and forming knuckles for the hinging of the leaf thereto. The bracket can be held in place by suitable means such as a set screw 16.

Normally lying between the parts or claws 13 and 14 is a leaf 17 which is substantially flush therewith and which lies flat against the running board when it is in its normal position. The leaf 17 is hinged to the ears 15 by the ears 18 and a pintle in the form of a bolt 19 holds the parts together and also acts as a support for the spring 20, one end of which bears on the leaf and one on the bracket and has a tendency to force the leaf down. The vertical plate 12 limits the movement of the leaf as the leaf rests against its top edge and the attachment of the device is easy as it is not necessary to hold the leaf up when the bracket is slid onto the edge of the running board.

The end of the leaf is bent down as at 21 to form a flange which covers the spring and as the leaf fits snugly between the parts of the bracket that flanks it, the spring is protected from water and the appearance of the device is improved.

The leaf has an opening or openings near its outer or free end and these may be arranged as shown in the drawing with narrow slits as 22 for a strap 23 so as to secure articles as the basket shown in Figure 1 and a smaller hole 24 can be used for passing a cord 25 through when a package is to be tied on.

The raised part 26 can be pressed into the leaf 17 to stiffen it and thus allow the use of relatively light material in the leaf.

It will be seen that the present device is inconspicuous and readily attached or detached and consists of two hinged elements, one of which is forked or U-shaped to receive the edge of a running board and this without the necessity of swinging the other element away to provide a clearance so that the device can be applied without swinging the elements apart.

Instead of using these carriers individually, I may use them in pairs pressed against a short board which in turn will hold the series of articles in place and another method of use for this invention is to take one or more of the carriers, place them on the edge of the running board and then take a board long enough to extend slightly over each end of the running board and to rest against the mud-guard on each end.

The leaf 17 of the carrier will press against the board and hold it in place and this transforms the running board into a box in which many articles can be securely held and it is particularly well adapted for touring. A box so formed on the automobile can also be used by a merchant who uses a passenger car for deliveries and the outer face of the board can be provided with an advertisement, all of which can be readily removed when not desired for use.

I claim:

1. A luggage carrier comprising a bracket with a bottom plate and an upright plate and having separated top plates and vertical ears, a flat leaf to normally rest between the top plates and on the top edge of the upright plate and having flanges to fit between the ears below the level of the top plates, a pintle passing through the ears and flanges, and a spring to normally hold the leaf down between the top plates.

2. A luggage carrier comprising a bracket with a bottom plate and an upright plate and having separated top plates and vertical ears, a flat leaf to normally rest between the top plates and on the top edge of the upright plate and having flanges to fit between the ears, a pintle passing through the ears and flanges and below the top plates, and a spring to normally hold the leaf down between the top plates, the leaf having openings near its free end for the reception of a strap.

In testimony whereof I affix my signature.

FREDERICK A. RUFF.